Oct. 4, 1932. G. M. EATON 1,881,385
CAMBERED SPRING
Filed March 13, 1929 2 Sheets-Sheet 1
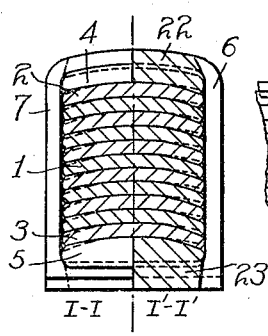
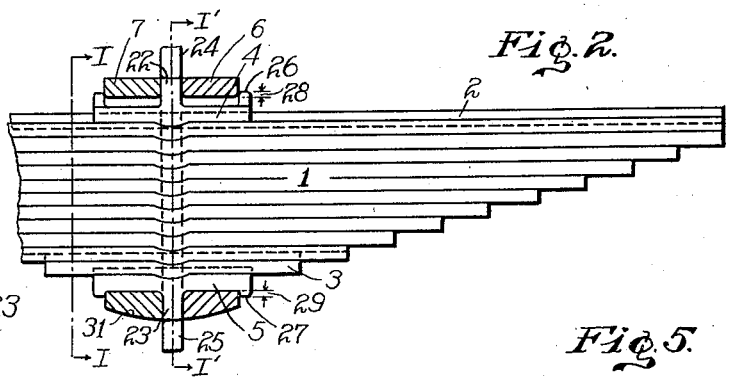
Fig. 1. Fig. 2.
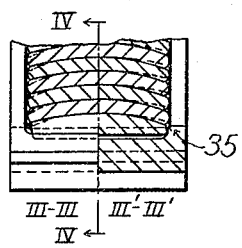
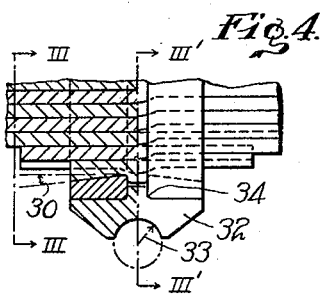
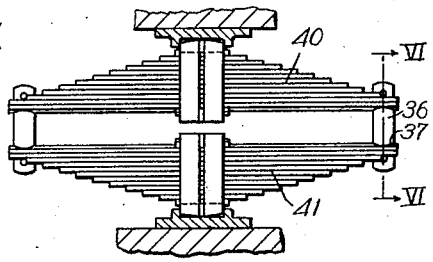
Fig. 3. Fig. 4. Fig. 5.
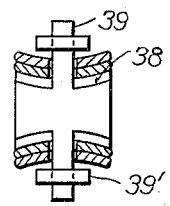
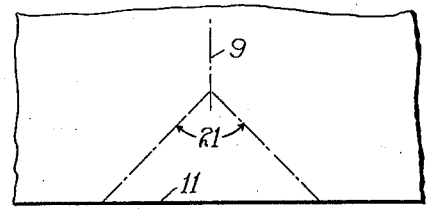
Fig. 6. Fig. 9.
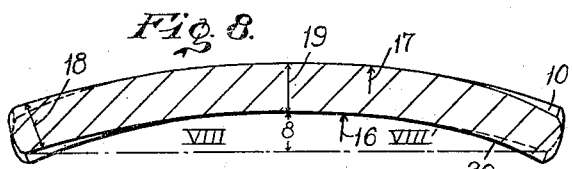
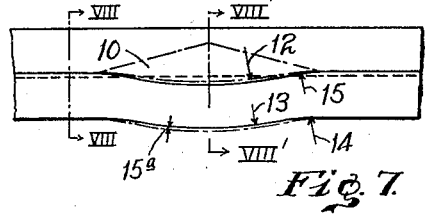
Fig. 8. Fig. 7.
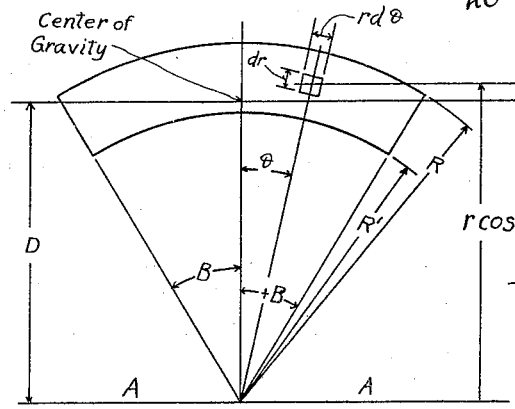
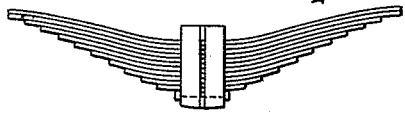
Fig. 11. Fig. 10.
INVENTOR
George M. Eaton
by William B. Jaspert.
Attorney.

Oct. 4, 1932.                G. M. EATON                1,881,385
                          CAMBERED SPRING
                    Filed March 13, 1929      2 Sheets-Sheet 2
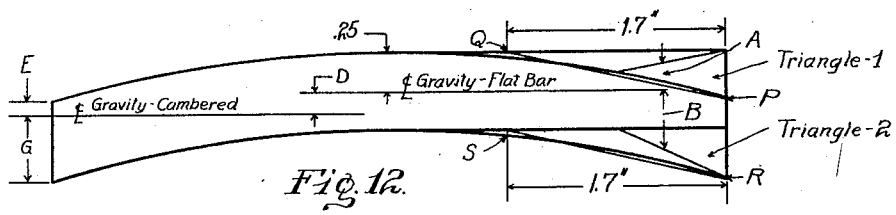
Fig. 12.
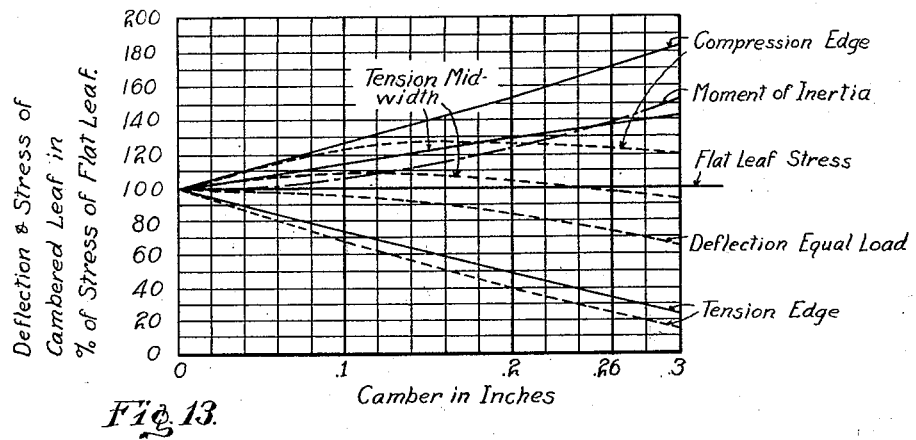
Fig. 13.
Fig. 15.                                Fig. 14.
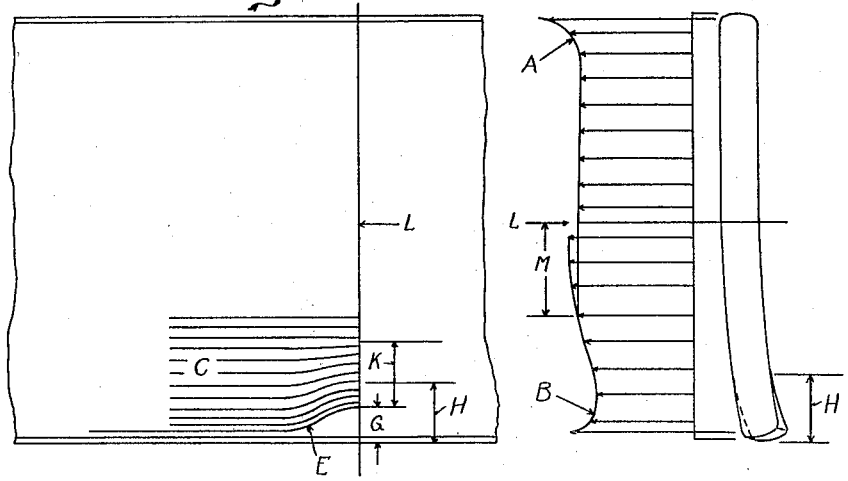
Fig. 16.
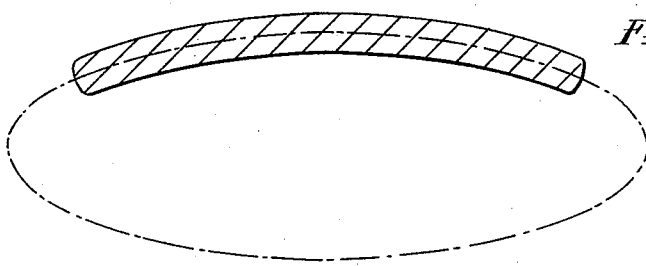
INVENTOR
George M. Eaton
by William B. Jaspert
Attorney.

Patented Oct. 4, 1932

1,881,385

UNITED STATES PATENT OFFICE

GEORGE M. EATON, OF PITTSBURGH, PENNSYLVANIA

CAMBERED SPRING

Application filed March 13, 1929. Serial No. 346,721.

This invention relates to improvements in laminated or leaf spring structure for use in railway vehicles, automobiles and other industrial applications.

A great deal of trouble and expense results from the breakage of individual leaves in leaf springs. These failures practically all start on the side of the leaf which is subjected to tension by the service load on the spring. Furthermore these failures start at a nucleus where the detail structure of the metal is weak and where stress concentration exists. Progressive fracture develops around this nucleus, which is followed eventually by complete failure of the leaf.

It is common practice to make a shape deformation at the mid-length of the leaf, which by cooperating with a complementary deformation in the adjacent leaves resists relative longitudinal movement of the leaves. This deformation is hereinafter referred to as an interlock. The shape of this interlock as used prior to my invention and the methods employed in producing this interlock give rise to incipient fracture and to stress concentrations which result in a large percentage of failures occurring through the interlock.

Another stress concentration which is a prolific source of failures occurs at the edges of the leaf and on the tension side. It is common practice to reduce this stress concentration below the value that it would have if the corners were left square, by a partial rounding off of the edges of the leaf, but even with this relief a material stress concentration remains at the tension edges.

It is one of the purposes of this invention to reduce the stress concentrations to which reference has been made by a modification of the shape of the cross section of the leaf, and by a further modification of the shape and location of the interlock, and to accomplish these ends without the introduction of any new critical stresses which will reduce the factor of safety of the spring leaf.

I accomplish the reduction of the critical edge tension by introducing into the leaf a slight cross camber. This cross camber increases the moment of intertia of the cross section and at the same time brings the tension edge closer to the neutral axis of the section.

I am well aware that this theory was advanced in part by Spaulding in U. S. Patents 237,625 and 245,097. Spaulding's structure however was thoroughly impractical, because with the degree of camber that he specified, three entirely new critical stresses were created, one a destructive tension stress at the mid-width of the tension side, and the other two, destructive compression stresses at the compression edges. The only possible way to avoid these destructive stresses in a leaf spring constructed under the specifications of the patents noted is to reduce the deflection to such a degree that the spring no longer fulfills its function in a practical manner.

In developing the present invention, I have evolved formulæ for calculating the relations existing between the limiting stresses of cambered leaves and flat leaves of equal width, equal mean thickness, and equal loading conditions, hereinafter referred to as "equivalent flat leaves".

It is a further purpose of my invention to provide means adapted to an improved assembly of the spring leaves, whereby the interlocks which resist relative longitudinal movement of the leaves, will also resist that relative angular movement of the leaves which is commonly referred to as fanning, and whereby the incipient fracture and much of the stress concentration attendant on the interlocks extensively used prior to my invention, are eliminated.

A further purpose of my invention is to introduce, between the spring bands and the stressed surfaces of the leaves adjacent to the bands, metal which is practically free from spring action, for the purpose of protecting the spring metal proper from thermal damage during the act of shrinking the spring bands home on the assembled spring leaves.

It is still a further object of my invention to provide a novel band structure which, preparatory to and during the application of the bands, will permit the clamping together of the assembled leaves at their mid-width, with a force materially greater than the maximum load imposed upon the spring in service.

And it is a further object of my invention to provide a structure whereby on certain springs the band, on shrinking home onto the assembled leaves becomes firmly interlocked in place so that relative longitudinal movement of the band and the leaves is prohibited.

In the accompanying drawings constituting a part hereof and in which like reference characters designate like parts;—

Fig. 1 is a cross section of a leaf spring, half on the line II and half on the line I' I' of Fig. 2, embodying the principles of this invention.

Fig. 2 is a side elevation of the spring partly in section,

Fig. 3 is a partial cross section, half on the line III—III and half on the line III'—III' of Fig. 4, and arranged for a different mounting, Fig. 4 is an elevation partly in section arranged for the mounting of Fig. 3, Fig. 5 is an elevation of a full elliptic leaf spring, Fig. 6 is a cross section of the spring of Fig. 5, Fig. 7 is an enlarged elevation of the interlock portion of the spring leaf, Fig. 8 is an enlarged section through the portion of Fig. 7, Fig. 9 is an enlarged plan of the portion of Fig. 7, Fig. 10 is a diagrammatic elevation of a semielliptical spring with longitudinal camber, Fig. 11 is a diagram used in connection with the analytic determination of the center of gravity and moment of inertia of the cambered cross section of a leaf, Fig. 12 is a corresponding diagram used in connection with approximating these values, Fig. 13 graphically illustrates the relation between the limiting stresses of certain leaves of varying cross camber and equivalent flat leaves, Fig. 14 graphically illustrates the stress distribution of a certain cross cambered leaf and the equivalent flat leaf, Fig. 15 graphically illustrates the stress distribution around the interlock of a leaf as covered by my invention, and Fig. 16 is a cross section of a spring leaf which is cross cambered on an elliptical arc.

In the drawings the springs are in all cases shown in the relaxed or unloaded position.

In the several figures of the drawings a leaf spring structure generally designated at 1, is composed of long leaves 2 and leaves of progressively shorter lengths ending with the short leaf 3. On top of the stack of leaves is a liner 4 and on the bottom a liner 5. The leaves and liners are held together by the bands 6 and 7, or they may be held by a single band as was customary prior to my invention.

Referring to Fig. 8, each leaf is cross cambered on a circular or other arc, the depth of camber being shown at 8. At the mid-length 9 of each leaf an interlock 10 is formed by forging the edge 11 of each leaf down in the direction of slope of the camber.

The curvature of the interlock is made with tangential arcs of radii 12—15 and 13—14. The radius 12 is practically equal to the radius 13 and the radius 14 is practically equal to the radius 15. But these radii are so proportioned that when two adjacent leaves are clamped hard together there is a slight clearance 15a over the entire area of the interlock. This is done so that normal production errors as for example those due to normal wear of the forming dies etc. will not result in the concentration of the band pressure on the interlocks instead of on the main cambered surfaces.

The radius of curvature 16 is practically equal to the radius of curvature 17. This results in the thickness 18 at the edge being slightly less than the thickness 19 at the midwidth.

The transverse curvature 20 of the interlock runs smoothly into the curvature 16 of the main camber of the leaf. The interlock narrows down as it departs from the edge as indicated by the angle 21. Throughout the entire boundary of the interlock it runs smoothly into the cambered shape of the leaf, for the purpose of reducing stress concentrations to a lower value than they would have with more abrupt changes of shape.

The assembly of the spring is carried out as follows when two bands are employed, as shown. The leaves 2 to 3 are stacked together in their proper relative position. The liners 4 and 5 are placed in correct position. The liner 4 has a projecting rib 22 and the liner 5 a projecting rib 23. The assembled parts are placed in a hydraulic or pneumatic assembly press (not shown). This device has plate grips 24 and 25 which engage ribs 22 and 23. The assembly device is then closed home with a load materially in excess of the maximum load imposed upon the spring in normal service. The bands 6 and 7, at high temperature, are then entered over the assembled parts and are shrunk home hard. I prefer in the shrinking operation to stress the bands somewhat beyond their elastic limit to insure a uniform gripping pressure even though the solid heights of various springs of the same design may vary slightly. The liners 4 and 5 are made with projections 26 and 27 which incorporate beads 28 and 29. These beads are made low enough to permit the bands in their hot condition to pass over them. It is evident that this results in a secure interlocking together of the entire spring structure. An alternate interlocking of the bands is shown in Fig. 4 where a taper 30 is forged in the production of the bands and liners.

The bottom of the bands 6 and 7 may be formed on a circular arc 31 to permit the spring 1 to rock as demanded by service conditions. When a pin support is desired for the spring, an adapter 32 may be provided. The bottom of this adapter is shaped on a cylinder of radius 33 and the top of the adapter is made with a rib 34 which enters between the bands 6 and 7. The ends of this rib are raised as shown at 35 to interlock the adapter transversely. It is evident that an indefinite number of supporting devices may be worked out under the scope of my invention. For further example, it may be strapped down by means of U-bolts as frequently done in the automotive industry. I have not shown the details of the loading of the ends of the semielliptic spring, as any of the methods employed in prior practice may be adapted by anyone skilled in the art.

In applying my invention to full elliptic springs, it is possible to forge the ends of the long leaves out flat and employ the usual type of connection. Unless the quantity of identical springs is very large, I prefer not to do this as the cost of proper tools is too high for small production. I therefore prefer to employ the general type of construction shown in Fig. 5. For convenience I have indicated a spring as made with the well known bayonet form of hanger widely used with semi-elliptic springs. Spacers 36 are placed between the two halves 40 and 41 of the complete spring. These spacers comprise a pair of bayonets 39 and bearing surfaces of double curved shape as indicated at 37 and 38. Safety pins or keys 39' may be used to hold the complete structure in general position during assembly or emergency service.

Fig. 10 shows a semi-elliptic spring built with longitudinal camber as well as cross camber. When a large production is involved as in the automotive industry, this may be desired and it is thoroughly practical as the cost of tools may be easily absorbed. But where a small number of identical springs is to be made it is more economical to build the spring with straight leaves longitudinally, permitting the working load to give the spring what is commonly termed a reverse camber.

All the cross cambers described thus far, and all with which I am acquainted in the art prior to my invention, have been made in the form of circular arcs. It is however possible to make a more refined shape which will result in a somewhat more advantageous stress distribution. Attention has been called to a possibly critical tension stress at the mid-width. If the camber is made with a variable radius of curvature, which is a maximum at the mid width and which gradually decreases toward the edges, the ratio of mid-width tension as cambered, to mid-width tension of equivalent flat, can be made less than is possible when the camber is in the form of a circular arc. A very advantageous form of camber is secured by the use of an elliptic arc, the major axis of the ellipse being parallel with a tangent at the mid-width of the leaf. This is shown in Fig. 16. The elliptic form may be approximated in a variety of obvious ways.

Since there exists a rather narrow degree of camber which will produce the desired stress distribution without the introduction of destructive stresses in locations other than those where trouble now starts, it is necessary to illustrate a method for calculating the relation between the stresses of cross cambered and equivalent flat leaves. The following methods are worked out for circular arc cambers for the sake of simplicity, but the general method can be applied to cambers of other form by those skilled in the art.

*Analytic determination of location of center of gravity of cross cambered leaf*

Referring to Fig. 11:—
Let M=moment of section about axis AA.
Let $a$=area of cross section.

$$M = \int_{R'}^{R} \int_{-B}^{+B} r d\theta dr \times r \cos \theta =$$

$$r^2 dr \cos \theta d\theta \frac{-r^3 \sin \theta}{3}$$

$$M = \frac{R^3 - (R')^3}{3} \times 2 \sin B = \frac{2(R^3 - (R')^3) \sin B}{3}$$

$$D = \frac{M}{a} = \frac{2(R^3 - (R')^3) \sin B}{3a}$$

*Analytic determination of moment of inertia of cross cambered section*

Let I=moment of inertia about axis through center of gravity of section.
Let $I_{AA}$=moment of inertia about axis AA.

$$I_{AA} = \int_{R'}^{R} \int_{-B}^{+B} r d\theta dr (r \cos \theta)^2 = r^3 dr \cos 2\theta d\theta =$$

$$\frac{r^4 (1/2\theta + 1/4 \sin 2\theta)}{4}$$

$$I_{AA} = \frac{R^4 - (R')^4 (B + 1/2 \sin 2B)}{4}$$

$$I = I_{AA} - aD^2$$

Unfortunately, with very small cambers, the above formula for I is not practical, because the value of I is so small compared with the values of I and of $aD$ that the usual tables of natural lines do not give the necessary number of decimal places for a reasonably close evaluation of I. Therefore, it is necessary to resort to an approximate method which will give practical accuracy.

*Approximate determination of moment of inertia of cross cambered section*

Referring to Fig. 12, a section equivalent to the cambered section is laid out on the basis of a flat or uncambered region over the middle of the section. The edge regions are also flat but are bent down following a straight line, the total camber thus secured being the same as in the actual section. This is done by laying off the lines PQ and RS by eye to make an approximation of the equivalent section.

Let A = distance from center of gravity of equivalent flat section to center of gravity of triangle 2.

Let B = corresponding distance for triangle 2.

Let D = distance between centers of gravity of cambered and equivalent flat sections.

$$D = \frac{\text{Area triangle } 1 \times A \text{ plus area triangle } 2 \times B}{a}$$

Where $a$ = area of cross section of spring, as before,

I = moment of inertia equivalent flat section.

Ic = moment of inertia cambered section.

Ic = I plus $aD^2$ minus area triangle $1 \times (A+D)^2$ plus area triangle $2 \times (B-D)^2$.

The moments of inertia of triangles 1 and 2 about an axis through their own center of gravity are neglected because the values are very small and one is added and the other is subtracted.

Let Tec = tension at edge of cambered leaf.

Let Tmc = tension at mid-width of cambered leaf.

Let Cec = compression at edge of cambered leaf.

These three stresses are first calculated on the basis of deflection equal to the deflection of the equivalent flat leaf.

Let M = bending moment on equivalent flat leaf = 100%.

Let Mc = bending moment on cambered leaf.

Let $d$ = deflection of equivalent flat leaf.

Let $dc$ = deflection of cambered leaf.

Let S = stress of equivalent flat leaf.

Let Sc = stress of cambered leaf.

Let $r$ = distance from neutral axis of equivalent flat leaf to the fibre investigated.

Let $rc$ = distance from neutral axis of equivalent flat leaf to the fibre investigated.

$$Mc = \frac{M \times Ic}{I} \text{ and } Ic = \frac{Mc \times I}{M}$$

$$S = \frac{M \times r}{I}$$

$$\frac{Sc}{S} = \frac{Mc \times rc}{Ic} = \frac{Mc \times rc \times M}{Mc \times I} = \frac{rc \times M}{I}$$

$$\text{and } Sc = S \times \frac{rc}{r}$$

$$Sc = \frac{rc \times M \times I}{I \times M \times r} = \frac{rc}{r}$$

The stresses and deflections are then calculated on the basis of equal load.

$$\frac{dc}{d} = \frac{I}{Ic}$$

$$Sc = \text{ stress at equal deflection} \times \frac{dc}{d}$$

The values derived on these two bases are quite closely correct for the shallow cambers involved in practical spring leaves, but the degree of accuracy decreases as the depth of camber increases, due to the assumption that the horizontal projections of the widths of the cambered and equivalent flat leaves are equal. The rounded edges of the leaves have been neglected as causing undue complication. The error resulting from this is negligible, since relative stresses rather than actual stresses are being derived. In using the approximate method, it is best to consider the width of the leaf as extending only to the edge of the flat portion of the equivalent flat leaf, as this is the point to which the depth of camber will be measured.

The results of calculations carried out on these two bases on a 5"x½" spring leaf with depths of circular arc cross camber ranging from zero to 0.3", are shown graphically in Fig. 13. In this figure 100% represents the stress of the equivalent flat leaf. The full line curves show the relation between cross cambered leaves and equivalent flat leaves under the condition of equal deflection. The dotted line curves show similar relations under the condition of equal load. The dot and dash line shows how the moment of inertia of the cross cambered leaf increases as a function of the depth of the camber.

In order to make proper selection of the depth of cross camber which will give the best compromise, it is necessary to know how the equivalent flat leaves fail in service. When the nucleus of failure to which reference has been made, happens to be located at or closely adjacent to the tension edge of the flat leaf, the fatigue crack develops very rapidly, as compared with the rate of fatigue development when the nucleus happens to be located remote from the tension edge. This is due to the fundamental stress concentration existing at the tension edge. When a rectangular beam is subjected to bending, the principles of elasticity show us that the stress at the tension edge is higher than the tension stresses at locations remote from the edge. The partial rounding of the edges of spring leaves which is current practice reduces this stress concentration, but an undesirable and as we have seen destructive stress concentration remains. Figs. 14 and 15 show graphically the general characteristic of stress distribution over the tension surface of cross cambered and equivalent flat leaves when subjected to bending. A shows the general characteristic of tension stress distribution of the equivalent flat leaf in regions not complicated by the interlock. B shows similar characteristic for a cross cambered leaf. C shows a family of tension lines as bent away from the edge by the presence of the interlock.

The following deductions can be drawn concerning the interlock proportions. There are more tension lines concentrated in the region K than in a similarly located region remote from the interlock. As the depth of the interlock D, in Fig. 7, is increased, the radius of curvature of stress lines at E is reduced, the distance G is increased, and the concentration at K is increased. It is important that the stress in the region K resulting from this concentration shall not exceed the stress at L. The outstanding point is that the region K of interlock stress concentration is a region of low beam stress concentration as shown by the contour B.

When the conditions of service for which a cross cambered spring is being developed, are such that a certain fixed deflection is imposed upon the spring, it is obvious that only a shallow camber can be tolerated if the flat leaf spring is subject to leaf failures because the mid-width tension rises with the increase of camber depth, and with a deep camber the critical failures would be transferred from the tension edge to the tension mid-width. When the conditions of service permit the sacrifice of deflection it will be noted that a deeper camber is permissible.

It is entirely proper to let the compression edge stress rise materially above those present in the flat leaf, because with the flat leaf the failures never start at the compression edge. But with the cross cambered leaf the stress concentration at the compression edge rises rapidly as a direct function of the depth of camber, and with an ill advised selection of deep camber it is possible to produce destructive edge compression stresses.

I claim herein as my invention:

1. A leaf spring having a cross camber, the radius of which is a maximum at the mid-width of the leaf and decreasing toward the edges of said leaf so that when subjected to stress, there is on the tension side a stress peak at the edge, the stress dropping rapidly to a minimum and rising gradually to another peak at the mid-width.

2. A leaf spring having a cross camber, the radius of which is a variable and being so proportioned that when subjected to stress, there is on the tension side a stress peak at the edge, the stress dropping rapidily to a minimum and rising gradually to another peak at the mid-width.

3. A leaf spring having a cross camber of the shape of an elliptical arc so that when subjected to stress, there is on the tension side a stress peak at the edge, the stress dropping rapidly to a minimum and rising gradually to another peak at the mid-width.

4. A leaf spring comprising a plurality of spring leaves in superposed relation, said leaves having concave and convex sides forming interlocks in spaced relation at their mid lengths, the curvatures of said concave and convex sides being substantially equal but with slight clearances.

In testimony whereof I have hereunto set my hand this 12 day of March, 1929.

GEORGE M. EATON.